(12) United States Patent
Kirchhoff et al.

(10) Patent No.: US 10,972,401 B1
(45) Date of Patent: Apr. 6, 2021

(54) MARINE PROPULSION CONTROL SYSTEM AND METHOD WITH CONFIGURATION FUNCTIONALITY VIA CAN BUS

(71) Applicant: Brunswick Corporation, Mettawa, IL (US)

(72) Inventors: Thomas S. Kirchhoff, Fond du Lac, WI (US); Kent A. Prochazka, Fort Collins, CO (US); Jason S. Arbuckle, Horicon, WI (US)

(73) Assignee: Brunswick Corporation, Mettawa, IL (US)

(*) Notice: Subject to any disclaimer, the term of this patent is extended or adjusted under 35 U.S.C. 154(b) by 305 days.

(21) Appl. No.: 16/162,062

(22) Filed: Oct. 16, 2018

(51) Int. Cl.
| | |
|---|---|
| *H04L 12/823* | (2013.01) |
| *H04L 12/40* | (2006.01) |
| *H04L 29/08* | (2006.01) |
| *H04L 12/58* | (2006.01) |
| *H04L 12/24* | (2006.01) |

(52) U.S. Cl.
CPC ...... *H04L 47/323* (2013.01); *H04L 12/40032* (2013.01); *H04L 12/40169* (2013.01); *H04L 41/12* (2013.01); *H04L 51/12* (2013.01); *H04L 67/12* (2013.01); *H04L 2012/40273* (2013.01); *H04L 2012/40286* (2013.01)

(58) Field of Classification Search
CPC ............ H04L 47/323; H04L 12/40032; H04L 12/40169; H04L 41/12; H04L 51/12; H04L 67/12; H04L 2012/40273; H04L 2012/40286
See application file for complete search history.

(56) References Cited

U.S. PATENT DOCUMENTS

| | | | |
|---|---|---|---|
| 6,273,771 B1 * | 8/2001 | Buckley | B63H 21/213 114/144 RE |
| 6,382,122 B1 | 5/2002 | Gaynor et al. | |
| 7,941,253 B1 | 5/2011 | Brant | |
| 9,892,073 B1 * | 2/2018 | Conrad | G06F 13/42 |
| 2014/0351460 A1 * | 11/2014 | Tsuboi | H04L 12/40169 710/36 |

* cited by examiner

*Primary Examiner* — Samina F Choudhry
(74) *Attorney, Agent, or Firm* — Andrus Intellectual Property Law, LLP

(57) ABSTRACT

A marine propulsion system includes a first controller area network (CAN) bus communicatively connecting two or more devices to facilitate communication of CAN messages therebetween. The system further includes a helm controller (HCM) associated with the propulsion device and having an HCM CAN transceiver to facilitate receipt and transmission of CAN messages by the HCM on the first CAN bus. The HCM is configured to receive a silence CAN message via the first CAN bus and then determine whether the silence CAN message is directed to itself. If so, then the HCM will cease transmitting any CAN message on the first CAN bus and/or cease CAN-related diagnostics in response to the silence CAN message so as to reduce traffic on the CAN bus.

20 Claims, 7 Drawing Sheets

MARINE PROPULSION CONTROL SYSTEM AND METHOD WITH CONFIGURATION FUNCTIONALITY VIA CAN BUS

FIELD

The present disclosure generally relates to a propulsion control system for a marine vessel and, more particularly, to a propulsion control method and system involving controllers communicating on a controller area network (CAN) bus providing improved functionality for initial configuration of the marine propulsion control system, and/or during a retrofit, repair, or recalibration procedure involving the propulsion control system.

BACKGROUND

Marine vessels, particularly those with helms or control stations located away from the marine propulsion devices, require some way to allow the marine vessel operator to be located at a helm or control station and be able to control operation of the marine vessel. This control includes the throttle control, steering control, and the monitoring of various operating parameters relating to the vessel. Marine vessel control systems utilizing "drive-by-wire" throttle and shift control arrangements are well-known, in which electronic signals are transmitted between the control station and the marine propulsion system to affect steering and/or engine speed control.

Various types of control systems have been developed to allow an operator to control a marine vessel. Some control systems incorporate numerous components that are connected by individual conductive wires to a central control station. Similarly, gauges are individually connected by conductive wire to various sensors in a typical application. Alternatively, other systems use a common communication bus to which all devices in the system are connected. One type of common communication bus is known as the controller area network (CAN) bus. CAN systems have been used for many years and are well known to those skilled in the art of marine vessel controls. The CAN bus can operate in extremely harsh environments and has extensive error checking mechanisms that ensure that any transmission errors are detected. The basic protocol of the CAN system can be used to accomplish many different control tasks and provide an arbitration scheme that effectively eliminates collisions or interferences between message packets transmitted by the multiple devices connected thereto. Thus, CAN systems are effective in avoiding interference between the signal from one device and a signal from another device. Different CAN system protocols, architectures, and arrangements are known in the relevant field of marine vessel controls, examples of which are shown and described in the following patents, which are each incorporated herein by reference in their entireties.

U.S. Pat. No. 6,273,771 discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 6,382,122 discloses an auto-detect system for a marine vessel in which the various associations and relationships between marine propulsion devices, gauges, sensors, and other components are quickly and easily determined. The system performs a method which automatically determines the number of marine propulsion devices on the marine vessel and, where needed, prompts the boat builder or marine vessel outfitter to enter various commands to identify particular marine propulsion devices with reference to their location on the marine vessel and to identify certain other components, such as gauges, with reference to both their location at a particular helm station and their association with a particular marine propulsion device.

U.S. Pat. No. 7,941,253 discloses a marine propulsion drive-by-wire control system that controls multiple marine engines, each one or more PCMs, propulsion controllers for controlling engine functions which may include steering or vessel vectoring. A helm has multiple ECUs, electronic control units, for controlling the multiple marine engines. A CAN, controller area network, bus connects the ECUs and PCMs with multiple PCM and ECU buses. The ECU buses are connected through respective isolation circuits isolating the respective ECU bus from spurious signals in another ECU bus.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One embodiment of a marine propulsion system includes a first controller area network (CAN) bus communicatively connecting two or more devices to facilitate communication of CAN messages therebetween. The system further includes a helm controller (HCM) associated with the propulsion device and having an HCM CAN transceiver to facilitate receipt and transmission of CAN messages by the HCM on the first CAN bus. The HCM is configured to receive a silence CAN message via the first CAN bus and then determine whether the silence CAN message is directed to itself. If so, then the HCM will cease transmitting any CAN message on the first CAN bus and/or cease CAN-related diagnostics in response to the silence CAN message so as to reduce traffic on the CAN bus. For example, the silence CAN message may be sent out, such as by a configuration computer, prior to reflashing a device communicating on the first CAN bus so as to reduce traffic thereon to expedite the reflashing.

One embodiment of a method of configuring a propulsion control system includes providing at least a first CAN bus communicatively connecting two or more devices to facilitate communication of CAN messages therebetween, and providing a first controller associated with a propulsion device and having a CAN transceiver to facilitate receipt and transmission of messages by the first controller on the first CAN bus. The method further includes, at the first controller, receiving a silence CAN message via the first CAN bus and, upon determining the silence CAN message is directed to itself, ceasing transmission of any CAN message on the first CAN bus in response to the silence CAN message so as to reduce traffic on the CAN bus, and also ceasing CAN related diagnostics in response to the silence CAN message so as to reduce error generation by the first controller.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
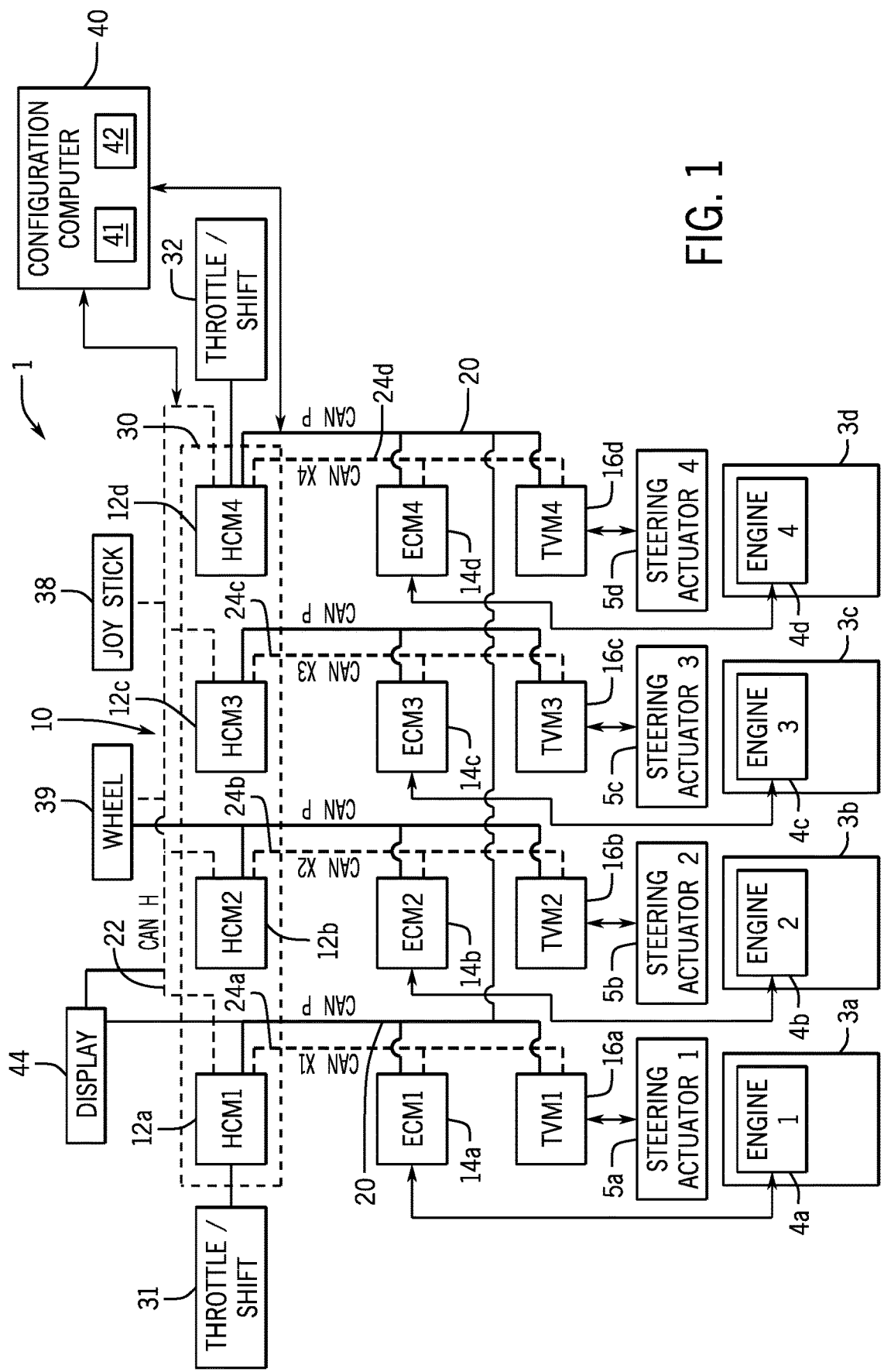
FIG. 1 is a schematic representation of an exemplary marine propulsion system including an exemplary set of propulsion devices and a corresponding propulsion control system.

Many marine vessels have propulsion systems comprising several marine propulsion devices, such as outboard motors, stern drive systems, inboard propulsion systems, or jet drives. In addition, marine vessels have at least one helm station, or control station, where a marine vessel operator can be located for the purpose of controlling operation of the marine vessel, including providing propulsion and steering control. Many marine vessels have two or more such helm stations. Each helm is provided with multiple systems and devices to allow the marine vessel operator to control the speed of the marine vessel, steer the marine vessel, and to monitor a plurality of gauges and sensor devices describing the status of various aspects of the marine vessel, including location status, engine status, information about the environment of the marine vessel, etc. All such devices comprise part of the propulsion control system 10.

Often, the various devices on a propulsion control system 10 communicate with one another via a common serial communication bus, such as CAN bus, where all of the marine propulsion devices, controllers, and associated sensors and gauges, are connected in signal communication with one or more CAN buses. Various CAN protocols are known in the art. One exemplary CAN architecture and protocol often employed in marine applications is the CAN Kingdom network provided by Kvaser Consultants AB of Sweden.

Each of the devices communicating as part of the CAN system must have a unique identification, typically referred to as a CAN address. Providing a unique CAN address for each of the devices communicating on the CAN bus allows determination of the identity of a particular device on the CAN bus, which allows for identification of a message source and can allow targeted communication between devices. Moreover, each controller, sensor, gauge, etc. must be appropriately assigned to its associated marine propulsion device. This is especially important where multiple propulsion devices, and thus multiple redundant controllers, are present on the network because it allows discrimination between the propulsion devices and associated controllers. Thereby, each propulsion device can be controlled separately and messages relating to each propulsion device, such as sensed values and error messages, can be correctly interpreted. Similarly, unique CAN addressing allows determination of the number of devices communicating on the CAN bus and also facilitates arbitration between conflicting messages.

In the disclosed system and method the CAN address for each device are configured to identify the device's function, and for all devices relating to a particular propulsion device—e.g., the engine controllers, helm controllers, steering controllers, sensors, etc.—the CAN address identifies the propulsion device to which it is attached. In a multi-propulsion-device system, the propulsion devices are typically identified based on their location on the marine vessel, such as the position at which they are mounted at the stern or on the transom of the marine vessel. For example, in a five propulsion device system, the propulsion devices may be identified as port outer, port inner, center, starboard inner, and starboard outer.

Because of the variability and customization of propulsion system configurations, CAN system setup and configuration has long been problematic. Relevant controllers, sensors, gauges, etc. are typically provided with a default CAN address, which needs to be changed during the configuration process. For example, for a propulsion system having multiple propulsion devices, each propulsion device typically has several controllers associated therewith, including an engine controller (ECM), a helm controller (HCM), and a thrust vector module (TVM). Each type of controller is typically sold and supplied with a default configuration having a default CAN address, and each controller then needs to be configured in the field to adjust the CAN address to associate each controller with a respective propulsion device and to configure the controller to recognize and operate on the one or more CAN buses in a particular propulsion system configuration and to communicate with all other devices communicating on those CAN busses. The default CAN address refers to a manufacturer or seller-set CAN address, which specifies default propulsion device position information. The default propulsion device position information may be, for example, a default specified position (e.g. the value typically designated for and associated with the port outer position). Alternatively, the default propulsion device position information may be a default value that is unassociated with any propulsion device position. Though the default CAN address typically includes information identifying the type, or function, of the device—e.g., engine controller, helm controller, GPS system, steering wheel position sensor—the default CAN address will not uniquely identify that device where on more than one of the same type of device is incorporated in a propulsion system because each of those modules has the same default CAN address.

Thus, the configuration process of multi-propulsion-device control systems is complicated by the fact that, initially, the configuration control software cannot single out a specific device between those having identical default CAN addresses in order to assign each device a unique CAN address. Moreover, if CAN addresses are not correctly assigned, debugging the control system to identify the problem is often problematic because the configuration control software cannot connect to or identify a specific module to determine if there are faults or other issues, and thus cannot identify the source of the problem. This makes a failed configuration procedure very difficult to correct in the field. Moreover, another failure point of current configuration procedures and methods is during reflash of the controllers, where the controllers are not properly rebooted in a way that enables new configuration settings to be fully written to the memory of the controller.

FIG. 1 depicts an exemplary propulsion system 1 that includes four propulsion devices 3a-3d. Each of the four propulsion devices 3a-3d has a respective position on the marine vessel, which includes a port outer propulsion device 3a, a port inner propulsion device 3b, a starboard inner propulsion device 3c, and a starboard outer propulsion device 3d. The propulsion devices 3a-3d may be any type of propulsion device appropriate for use in propelling a marine vessel, such as an outboard motor, a stern drive, an inboard motor, a jet drive, etc.

The propulsion control system 10 for the propulsion system 1 includes a set of controllers for each propulsion device 3a-3d. A helm controller (HCM) 12 is provided for determining and conveying instructions relating to the helm devices and/or determining steering instructions based thereon. For example, the HCM 12 may be configured to determine steering instructions based on inputs from the joystick 38 and/or steering wheel 39 at the helm, display-related instructions to and from the display 44, and throttle and shift instructions received at the corresponding throttle/shift levers 31, 32. In certain embodiments, an HCM 12a-12d is provided for each propulsion device 3a-3d. In other embodiments, a single HCM 12 may be provided that is configured to determine control instructions for more than one propulsion device, such as one HCM configured to control all propulsion devices 3a-3d on the marine vessel. The exemplary control system 10 in FIG. 1 further includes an engine controller (ECM) 14a-14d for controlling each engine 4a-4a of each respective propulsion device 3a-3d, such as to control engine speed and/or other engine parameters in order to effectuate propulsion input, such as by the throttle/shift levers 31, 32 and/or the joystick 38. In certain embodiments, a thrust vector module (TVM) 16a-16d may also be included for each propulsion device. Each TVM controls steering of a propulsion device 3a-3d, such as by controlling a steering actuator 5a-5d to effectuate a steering position of each propulsion device 3a-3d. In certain embodiments, the TVMs 16a-16d may further be configured to control trim actuators and/or other trim devices (such as trim tabs) associated with the propulsion devices 3a-3d and/or the marine vessel. In other embodiments, the control system 10 may further include one or more dedicated trim actuators, such as a trim controller for each trimmable device (e.g. each propulsion device 3a-3d and each trim tab) within the propulsion system 1. In certain embodiments, each TVM 16a-16d may further be configured to send control signals to a transmission within the propulsion device 3a-3d (e.g., a clutch, such as a dog clutch, or a continuous variable transmission) in order to control the direction of thrust by the propulsion device 3a-3d in response in response to input via the throttle/shift levers 31-32 and/or the joystick 38. In other embodiments, the ECM may control the transmission, including shifting and/or slip functionality.

The various controllers within the control system 10 are connected via one or more serial communication buses, such as CAN buses managed according to a CAN protocol. In the depicted environment, the CAN system is organized to include a helm CAN bus (CAN H) 22 connecting the HCMs 12a-12d. The helm CAN bus 22 communicates messages between the HCMs 12a-12d and messages from the various helm devices connected thereto, including the joystick 38, the steering wheel 39, and the display 44. In certain embodiments, each helm device 38, 39, 44 may include its own device controller—e.g. a display controller controlling functionality of the display 44—that sends and receives messages on the helm can bus 22 and/or one of the other CAN buses in the control system 10. The display 44 may be any available display device capable of interacting with the various control system 10 devices and providing user interaction therewith. One exemplary display device is the VesselView system by Mercury Marine of Fond du Lac, Wis. In the depicted embodiment, each throttle/shift lever 31 and 32 is connected to a corresponding HCM 12a and 12d. Signals relating to the position of the throttle/shift levers 31, 32 (e.g. from lever position sensors in a remote control) are thus provided as direct inputs to the respective HCM 12a, 12d. That HCM, 12a, 12d then communicates throttle and shift demand values via one or more of the available CAN buses 20, 22, 24 in accordance with the throttle/shift lever positions sensed by lever position sensors.

The control system 10 further includes a propulsion CAN bus 20 (CAN P) connecting all controllers, including all HCMs 12a-12d, all ECMs 14a-14d, and all TVMs 16a-16d for the propulsion devices 3a-3d. In this embodiment, the steering wheel 39 also communicates on the propulsion CAN bus 20. Thus, messages communicated on the propulsion CAN bus are available to any of the controllers 12, 14, 16. The control system 10 further includes a dedicated CAN bus 24a-24d for each propulsion device 3a-3d. Specifically, a first dedicated CAN bus (CAN X1) 24a is provided to facilitate communication of messages only between the HCM 12a, ECM 14a, and TVM 16a for the first propulsion device 3a. Thus, messages communicated on the first dedicated CAN bus 24a are only receivable by the other controllers 12a, 14a, 16a associated with the same propulsion device 3a. Likewise, a second dedicated (CAN X2) 24b is provided connecting the HCM 12b, ECM 14b, and TVM 16b associated with the second propulsion device 3b. A third dedicated CAN bus (CAN X3) 24c connects the HCM 12c, ECM 14c, and TVM 16c, for the third propulsion device 3c. A fourth dedicated CAN bus (CAN X4) 24d connects the HCM 12d, ECM 14d, and TVM 16d for the fourth propulsion device 3d.

Figure 4:
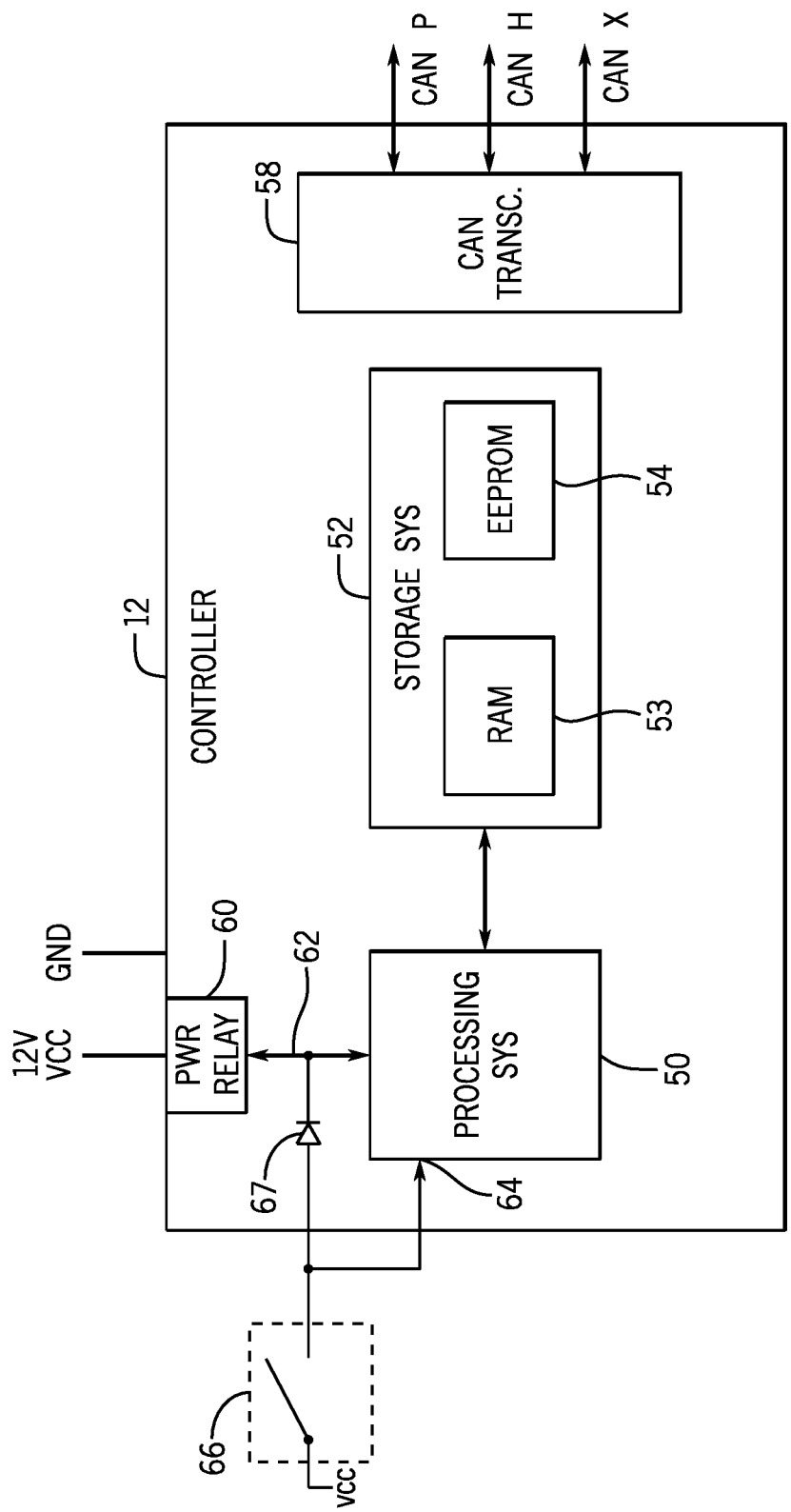
FIG. 4 is a schematic diagram of an exemplary controller operating within one embodiment of the disclosed propulsion control system.

Referring also to FIG. 4, each controller 12, 14, 16 includes a processing system 50 and a storage system 52, wherein processing system loads and executes software providing control instructions from the storage system. FIG. 4 depicts an exemplary helm controller 12 comprising a CAN transceiver 58 providing communication on a propulsion CAN bus (CAN P), a helm CAN bus (CAN H), and a dedicated CAN bus (CAN X). As will be understood in the art, this set of CAN buses is merely exemplary and any bus configuration may be provided. For example, each of the ECMs 14 and TVMs 16 may have a similar or identical arrangement, except that those controller-types do not communicate on the helm CAN bus. Each controller 12, 14, 16 has a power relay 60 controllable via the processing system 50 to internally control the power to the various elements and devices in the controller 12, 14, 16 (such power connections are not shown in the figure for purposes visual clarity). In the example, the processing system 50 of each controller can receive power via the key switch 66 or the power relay 60. A diode 67 is positioned between the key switch 66 and the power relay 60 so that the power relay 60 does not power the key switch line. The key switch 66 also feeds to input 64 in the processing system 50 so that the processing system 50 can sense that the key switch is asserted/not asserted. In certain embodiments, the processing system 50 can control the power relay 60 to assert a "hold on" line to keep the power relay 60 in a state where it is passing VCC through the connection 62. This arrangement allows the processing system 50 to turn on via the key switch 66, and to remain on once the key switch 66 is not asserted in order to perform shutdown routines, etc.

The HCMs 12, ECMs 14, and TVMs 16 contain computer-executable instructions to perform the methods and functions described herein. Each processing system 50 includes a processor, such as a microprocessor or a processor core of a microcontroller, and each storage system 52 includes one or more storage media comprising one or more memory types 53, 54 capable of storing the CAN address and the software instructions and readable by the processing system. For example, the storage suitable for media may include any combination of random access memory (RAM), read-only memory (ROM), flash memory, etc. For example, controllers suitable for marine control systems 10 typically contain both ROM and RAM. In the depicted example, the exemplary controller 12 contains RAM 53 and EEPROM 54. The configuration settings, including the CAN address, of each controller are stored in EEPROM 54 and are thus maintained even when the controller is off—i.e. in the absence of a power supply. In other embodiments, a different memory type may be used for storing the configuration settings, including the CAN address, such as Ferroelectric RAM (FRAM). When each controller 12, 14, 16 boots up, it loads the configuration settings from EEPROM and starts using that data to perform its operations, such as CAN instruction recognition and CAN messaging.

Turning back to FIG. 1, a configuration computer 40 is provided, which is generally a computing device (such as having a central processing unit) equipped with configuration control software 41 for facilitating configuration of the control system 10. The configuration control software 41 may be, for example, Mercury Computer Diagnostic System (CDS) G3 software by Mercury Marine Corporation of Fond du Lac, Wis. providing configuration and diagnostic support for marine joystick piloting systems. The configuration computer 40 includes a user interface 42 configured to receive input from a user, and may include a mouse, a keyboard, a voice input device, a touch input device for receiving a gesture from a user, a motion input device for detecting non-touch gestures and other motions by a user, and other comparable input devices and associated processing elements capable of receiving input from a user. Output devices such as a video display or graphical display can display an interface further associated with embodiments of the system and method.

A user, such as a field technician, utilizes the configuration computer 40 to execute the configuration control software 41 in order to facilitate configuration of the control system 10, including setting CAN addresses for the various controllers 12, 14, 16 comprising part of the control system 10. The configuration computer 40 is configured to communicate on the propulsion CAN bus 20 and the helm CAN bus 22, but is not capable of communicating CAN messages on any of the dedicated CAN buses 24a-24d. These dedicated CAN buses 24a-24d, can thus be utilized through the configuration process to send targeted change address CAN messages since these messages will only reach the controllers 12, 14, 16 associated with one propulsion device 3 and thus will not be received by two modules of the same type.

The disclosed system and method allows the provision and maintenance of identical HCM components, ECM components, and TVM components for all propulsion devices on a multi-engine system. In other words, each controller of a particular type is sold having identical hardware and software (i.e., all HCMs are identical, all ECMs are identical, all TVMs are identical), and enables automatic addressing of all the controllers in the system as an initial step in the configuration process. The inventors developed the disclosed system and method upon the recognition that existing control system configurations require time-consuming, confusing, and error-prone configuration procedures in order to rig a multi-propulsion-system vessel. The existing procedure requires a technician or installer, who is guided by existing configuration control software, to first specify an arrangement of the control system 10 (e.g., number of propulsion devices and associated controllers) and then to move levers in a particular fashion to set each HCM 12, ECM 14, and TVM 16 position uniquely in order to associate each controllers with a propulsion device in the specified arrangement. For example, existing procedures require the installer to move a throttle lever to a particular location (e.g. maximum reverse) based on the desired configuration location. For example, in a propulsion system with four propulsion devices 3a-3d, existing configuration procedures and software require the user to move the throttle lever associated with the each propulsion device 3a-3d to a reverse wide open throttle (WOT) in order to identify and set the location of each controller, HCMs 12a-12d, ECM 14a-14d, and TVM 16a-16d. The user is instructed to perform the maneuver, and once completed the user clicks "OK" via the user interface 42 on the configuration computer 40. The selected HCM 12a-12d then sends a change address CAN message to the corresponding ECM 14a and/or TVM 16a to instruct those modules to change their CAN address based on the location of the HCM.

The user must repeat this process for each propulsion device, including performing each throttle lever maneuver, confirming each throttle lever maneuver, and sending a change address CAN message from the HCM 12 to the other controllers 12 and 14. Note that this procedure is for configurations where each propulsion device 3a-3d has a unique lever. Other propulsion control configurations are possible, such as that depicted in FIG. 1, where certain propulsion devices "shadow" the lever position of other levers. In the example at FIG. 1, the inner propulsion devices 3b and 3c shadow the corresponding outer propulsion devices 3a and 3d. Existing setup procedures for such a configuration require resistive packs installed on the lever inputs of the shadow HCMs 12b and 12c to specify their location, and thus set their correct CAN addresses.

Once completed, all of the modules must be rebooted in order for the new CAN address to be written to memory of that CAN module and utilized subsequent messaging. The shutdown procedure is arduous and typically involves instructing a user to shut down the propulsion devices and corresponding controllers in a particular order and wait a threshold amount of time before keying back up. This process is error-prone and can easily be performed incorrectly. If the configuration is incorrect, troubleshooting the error is extremely difficult since the CAN addresses are incorrect and thus the various controllers cannot be properly identified or distinguished from one another.

More specifically, current configuration procedures require a user to key off each propulsion device and related controllers at multiple points during configuration and such key cycling is required to be performed in a particular way in order to ensure that the new configuration settings are properly written to memory. For example, someone installing a control system having four propulsion devices may be instructed at multiple points during configuration to key off each of the four propulsion devices in a particular order, and to wait at least a threshold amount of time before turning the key switch back on to allow all of the configuration settings to be written to memory. This can be especially burdensome in large vessels where, as is common, the key switches are far away from the helm, such as in the bottom of the vessel near the generators, electrical panels, etc. Moreover, this process is error-prone because if the key off is not performed in the particular order, or the installer does not wait long enough before restarting the propulsion devices, then the configuration settings will not be fully written to memory and in certain instances the configuration failure may even cause a fatal error for that controller. CAN bus traffic can further complicate matters, where messages transmitted on one or more of the CAN buses communicating to a particular controller interfere with the reboot process and prevent a controller from completing the write process. Accordingly, the inventors have developed the present system which provides improved configuration functionality that reduces errors and reduces the burden on the user, such as the control system technician, for installing and repairing the control system.

Due to system constraints, many marine control modules are configured to only write values to EEPROM (or FRAM or flash memory) at shutdown. For example, many controllers utilize EEPROM, which has a limited number of write cycles in an expected lifetime. Thus, limiting the frequency at which values are written to EEPROM is beneficial, and periodically writing to EEPROM (such as once every minute) is not ideal because it will significantly shorten the life of the controller. Accordingly, rebooting the controller is typically required in order to write new configuration values to memory and use them in operation by the controller 12, 14, 16. For example, the CAN transceiver 58 will not begin use of a new CAN address, or any other configuration setting relevant to CAN communication, until the controller has been rebooted, which includes completing a series of shutdown procedures by the processing system 50 and completely powering down the processing system 50.

Where reflash is occurring—a complete overwrite of the programming stored in EEPROM (or FRAM)—the shutdown procedure can take much longer, from a few seconds up to several minutes. The duration of the shutdown procedure will depend on how much data needs to be written to memory, such as EEPROM or FRAM, during the reflash. Additionally, the duration of the writing process can depend on how much CAN traffic is occurring on the relevant CAN buses 20, 22, 24 in the control system 10. The more devices that are on a CAN bus, the greater the traffic on the CAN bus. This slows down the reflash process and can also cause errors. When a controller receives a message that it is configured to respond to, it can cause the controller to exit the reflash process. In the best case scenario, the reflash process would restart following response to the CAN message, and thus the reflash will only be delayed due to the CAN traffic. However, CAN messages received by a controller during reflash can cause errors, including fatal errors that leave the controller inoperable, causing it to lose its internal program and/or the memory to be written improperly. In one specific example of this problem, errors during reflash of controllers 12, 14, 16 have been caused by CAN messages sent by displays 44 during control system 10 configuration processes. Multiple other failures, where communication between the controllers 12, 14, 16 is interrupted, are also possible and have been identified by the inventors.

The inventors have recognized that delays in rewrite due to CAN traffic have become a significant problem. Due to the number of devices that are now incorporated into many control systems 10, CAN bus traffic often causes significant delays during reflashing. These delays have increased the amount of time required to configure and/or provide maintenance to a control system 10, and thus have led to increased cost. This increased CAN traffic has also increased the chance of error due to operators providing insufficient time during a key cycle for memory to be properly and fully written. For example, CAN buses commonly run utilizing 70% of available bus traffic bandwidth, leaving only 30% available for reflash procedures. On a CAN bus permitting 31 kilobytes per second of CAN traffic, for example, this leaves only about 9.6 kilobytes per second for flashing processes. Many reflashing processes require writing 500 to 600 kilobytes of data, and thus the reflashing process to be executed during shutdown can take well over one minute. In circumstances with very high bus traffic or where a larger amount of data needs to be written to memory, reflashing may take longer, even several minutes. If the installation technician does not leave the key switch in the off position for sufficient time, then the reflashing will be incomplete, and such incomplete reflashing may even cause an error leaving the controller inoperable.

In view of the foregoing problems and challenges with control system configuration, the inventors developed the disclosed systems and methods that enable automatic save and reboot functionality within the control system that can be executed without user interaction to key cycle each propulsion system. Alternatively or additionally, certain embodiments of the disclosed control systems and methods facilitate reliable and efficient reflashing prior to automatic reboot by silencing CAN traffic on the CAN busses, wherein one or more controllers 12, 14, 16 operating on the CAN bus stop transmitting CAN messages and/or cease CAN-related diagnostics in response to a silence CAN message. The automatic reboot functionality will be discussed first, and then the silencing CAN traffic functionality.

One embodiment of the disclosed system and method includes sending a reboot instruction CAN message to one or more controllers, which may be directed to an individual controller or to a group of controllers, such as all HCMs 12a-12b, all ECMs 14a-14b, etc. Each of the control modules 12, 14, 16 is configured such that upon verifying that the reboot instruction CAN message is directed to that controller (i.e., directed to itself), the controller 12, 14, 16 will write configuration values which are awaiting storage in EEPROM and will automatically shut down, ignoring the key switch value indicating that the propulsion device is keyed on. As the main power relay can also prevent the controller from shutting down, the controller is configured to manage the main power relay 60 so that the processing system 50 completes its shutdown procedures, including writing to memory, and shuts down completely. After shutdown is complete, the controller will automatically restart because the key switch is still enabled—i.e., the key is turned on and powering relevant portions of the propulsion system 1. This strategy allows configuration values, such as CAN addressing, vessel personality, and other user preferences and tracked parameters (e.g., engine hours), to take effect without a complete power cycle of the propulsion system 1. Moreover, this strategy can be used during service of a specific controller or group of controllers, such as during trim-limit configuration or tach versus tach-link configuration.

The inventors have further developed methods and systems to facilitate control system configuration to facilitate fast and efficient reflashing during the shutdown and reboot process. In one embodiment, the controllers 12, 14, 16 are configured to receive and respond to a silence CAN message, which may be transmitted by a configuration computer 40 operating configuration control software 41 or by another controller 12, 14, 16 within the control system 10 permitted to transmit such messages. In response to determining that a silence CAN message is directed to itself, each controller 12, 14, 16 is configured to cease transmitting any CAN message on one or all of the CAN buses 20, 22, 24.

Alternatively or additionally, each controller 12, 14, 16 may be configured to respond to a silence CAN message by ceasing CAN-related diagnostic processes. This disables CAN-related diagnostics within the respective control module. CAN-related diagnostic processes account for a significant portion of possible error message generation, often comprising more than 80% of the possible errors, or faults, that can be generated by the respective control module 12, 14, 16. Thus, when a controller 12, 14, 16 within the control system 10 is taken offline, each of the other controllers 12, 14, 16 will generate a number of error messages. The transmission of these error messages by each of the controllers 12, 14, 16 communicating on one or more of the CAN buses 20, 22, 24 can create a sudden increase in CAN traffic, which as described above can delay reflashing and/or even cause a fatal error for the reflashed controller.

The disclosed silence CAN message functionality significantly reduces CAN traffic by stopping transmission of the error messages as well as stopping transmission of all CAN messages. Additionally, aside from the suspension of CAN message transmission, one or more of the control modules 12, 14, 16 may be configured to reduce CAN traffic by disabling the CAN-related diagnostics, and thus reducing CAN traffic by not generating error messages in the first place. This would alleviate the immediate spike in CAN traffic caused by a controller shutting down, and thus stopping CAN messaging and not being visible to the other controllers 12, 14, 16 within the control system 10. Moreover, the suspension of CAN-related diagnostics can be used in addition to the suspension of CAN message transmission to reduce the amount of useless error message generation that would otherwise be caused by rebooting one or more of the control modules 12, 14, 16. This strategy of silencing CAN messaging allows reflashing to be expedited and performed in a controlled and predictable manner, thus reducing errors caused by a user's improper performance of configuration steps. Similarly, the silence CAN functionality can be utilized for a reboot to write the configuration values to memory, or during an automatic reboot for any purpose, so that error messages are not uselessly generated by other devices operating on the CAN bus(es) with the rebooted controller 12, 14, 16.

Figure 2:
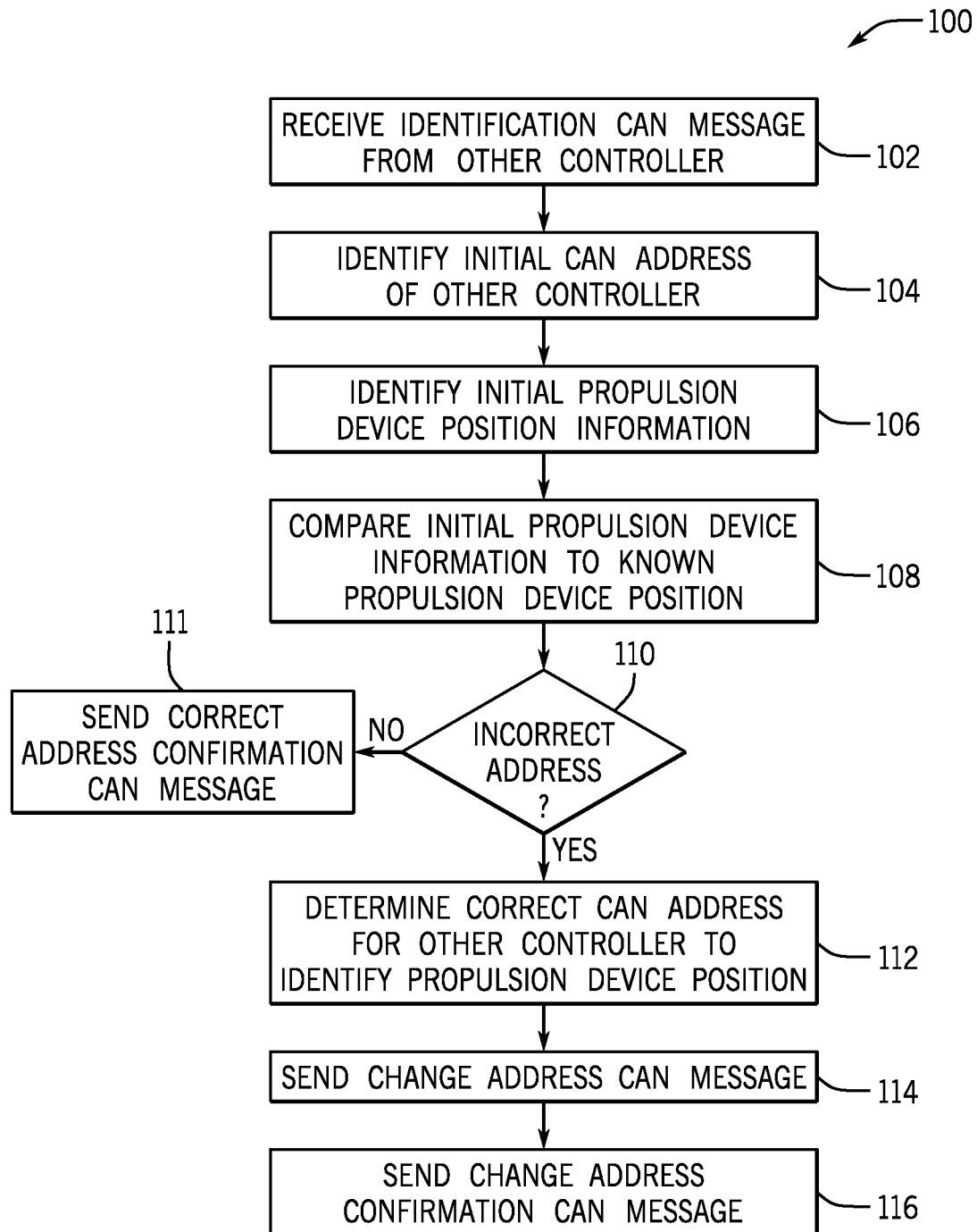
FIGS. 2 and 3A-3B depict embodiments of methods, or portions thereof, of configuring a marine propulsion system in accordance with the present disclosure.

FIG. 2 depicts one embodiment of method steps executed by one controller in the control system 10 in order to change the CAN addresses of other controllers associated with the same propulsion device. In the configuration of FIG. 1, each of the HCMs 12a-12d are configured with software—i.e., instructions executable on a processor—to assess the CAN addresses of the other controllers associated with the same propulsion devices 3a-3d to determine whether they are configured with the correct propulsion device position. In the method 100 exemplified at FIG. 2, the HCM 12 receives an identification CAN message from another controller at step 102, wherein the CAN message is transmitted via the dedicated CAN bus 24 and thus the other controller is certain to be associated with the same propulsion device 3.

Step 104 is executed to assess the initial CAN address received from the other controller and initial propulsion device information is identified at step 106. The initial propulsion device information is compared to the known propulsion device position at step 108. For example, the propulsion device position may be specified at certain digits in the CAN address, such as according to a preset code where each propulsion device position is specified by one or more digits at a certain location in the CAN address. The comparison at step 108 would then determine whether those digits in the initial CAN address match digits at the same location in the HCM CAN address. If so, then the HCM determines at step 110 that the other controller has the correct CAN address. In certain embodiments, the HCM 12 may then send a correct address confirmation message at step 111 on one of the CAN buses that connect to the configuration computer 40 so that the user can verify that the controllers associated with that propulsion device 3a-3d are correctly addressed.

If the initial propulsion device information does not match the propulsion device position known by the HCM 12, then an incorrect address determination is made that the initial CAN address for the other controller does not properly specify the propulsion device position. The HCM 12 then determines the correct CAN address for the one or more other controllers 14, 16 associated with the same propulsion device 3, which correctly identifies the propulsion device position. For example, the HCM 12 may simply replace the digits containing the initial propulsion device information with values specifying the correct propulsion device position. The HCM 12 then sends a change address CAN message at step 114 over the dedicated CAN bus 24, where the change address CAN message instructs replacement of the initial CAN address with the correct CAN address determined at step 112. In certain embodiments, the HCM 12 may then send a change address confirmation CAN message at step 116 on a CAN bus to which the configuration computer 40 is attached (e.g. the propulsion CAN bus 20 or the helm CAN bus 22). The change address confirmation CAN message is then utilized by the configuration control software 41 to provide notification to the user (e.g. via the user interface 42) that the change address instruction has been sent and/or the change address process is complete.

Figure 3A:
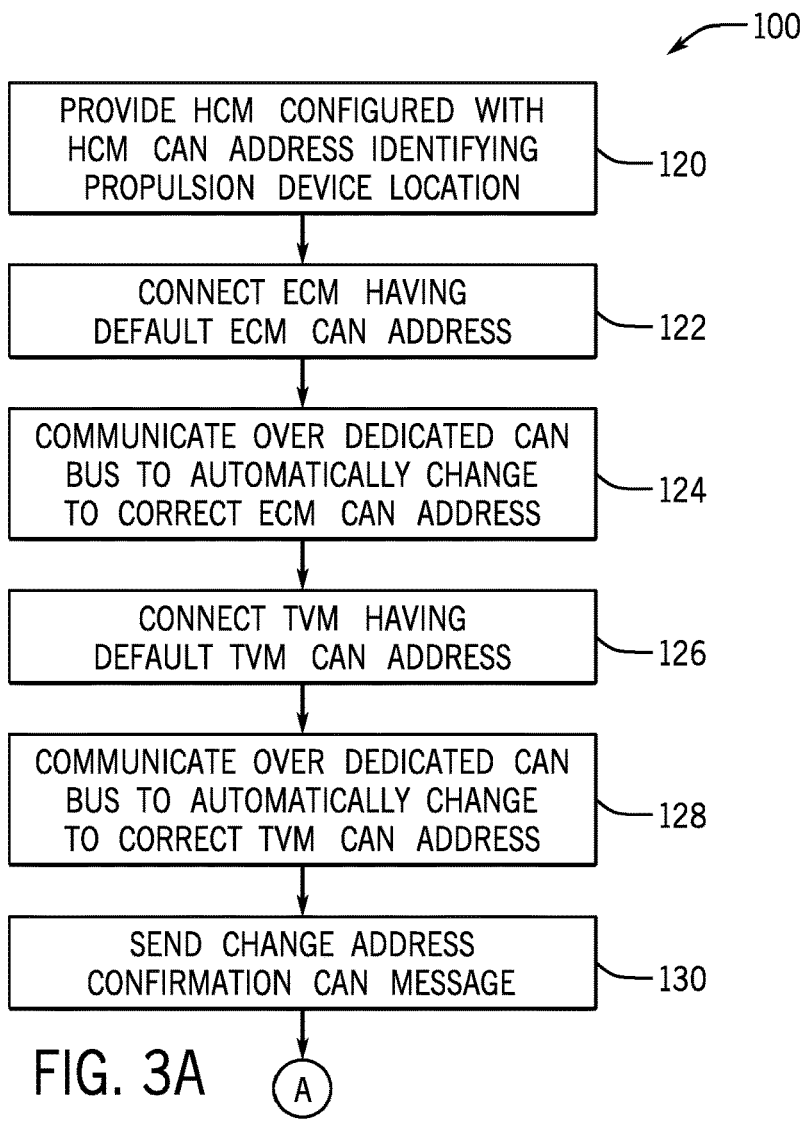
Figure 3B:
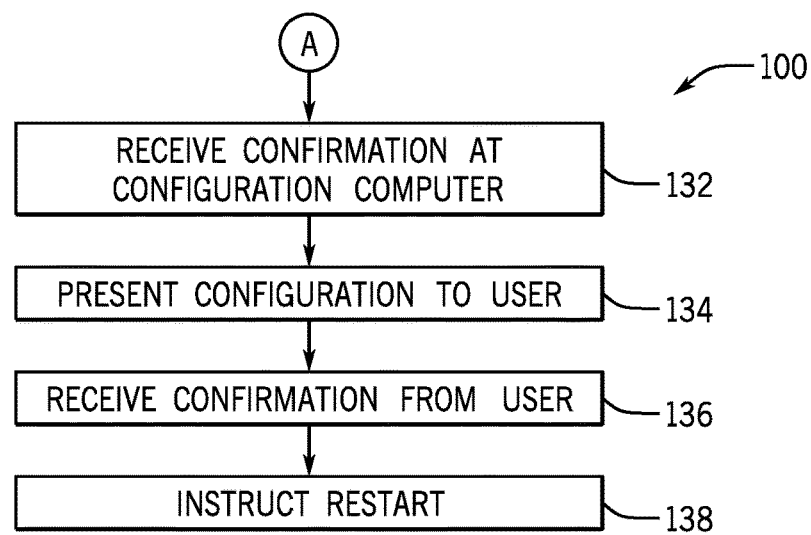

FIGS. 3A and 3B depict additional aspects of a method 100 of configuring a propulsion system. At step 120, an HCM 12 is provided that is configured with an HCM CAN address correctly identifying the propulsion device location of the associated propulsion device 3. In the depicted example, a new ECM 14 having a default ECM CAN address is connected at step 122 and a new TVM 16 having a default TVM CAN address is connected at step 126. Connection of the new controllers 14, 16 into the control system 10 can be done in any order and may be done simultaneously or in series. Alternatively, only one new controller 14 or 16 may be connected, such as to replace a failed controller of the corresponding type.

Instructions are executed by the respective controllers at step 124 and 128 to automatically change the default CAN addresses to correct CAN addresses. Specifically, instructions are executed at step 124 to communicate over the dedicated CAN bus 24 for the respective propulsion device to automatically change the initial ECM CAN address (i.e. the default value) to the correct ECM CAN address. For example, the steps illustrated in FIG. 2 may be executed by the HCM 12. Likewise, if a new TVM 16 is connected, instructions are executed by the respective TVM 16 and HCM 12 to communicate over the dedicated CAN bus 24 to change the initial CAN address to the correct TVM CAN address, as represented at step 128. A change address confirmation CAN message is then sent at step 130 to the configuration computer 40 specifying what change address CAN message was sent. As described above, the change address confirmation CAN message is sent by a CAN bus to which the configuration computer 40 is connected, such as the propulsion CAN bus 20 or the helm CAN bus 22.

The configuration computer 40, under control of the configuration control software 41, may then execute steps to verify the control system 10 configuration with the user and to finalize the configuration by instructing power down and restart of each controller 12, 14, 16 in the control system 10. Exemplary method 100 steps are illustrated in FIG. 3b. The change address confirmation CAN message is received at the configuration computer 40 at step 132. The configuration computer 40 presents the configuration to the user at step 134, such as via the user interface 42. The user is prompted to provide input to confirm the control system 10 configuration, and such confirmation input is received from the user at step 136. The configuration computer 40 then instructs restart of the control system 10 at step 138. For example, the configuration computer 40 may present an instruction via the user interface 42 to the user to key cycle the propulsion system 1. Alternatively, the configuration computer 40 may send a CAN message to one or more of the controllers to restart themselves. For example, the configuration computer 40 may send a CAN message directed to each controller class (e.g. ECM 14 or TVM 16) for all such modules to save and reboot so that the correct CAN addresses can be written to memory.

As will be understood by a person having ordinary skill in the art in light of this disclosure, other situations aside from initial configuration to change the default CAN address may require execution of the foregoing steps, such as system reconfiguration where propulsion devices and/or controllers are added, removed, or replaced in the propulsion system 1, and thus controllers need to be readdressed accordingly. Thus, the initial CAN address may not always be a default address, but may be any unverified CAN address.

The steps to automatically assign CAN addresses to controllers in the control system 10 require an initial position configuration of at least one controller in the system, which is the controller configured to then assign correct CAN address to the remaining controllers for the corresponding propulsion device 3a-3d. In the various embodiments described herein, the HCM 12 is configured for such tasks; however, in other embodiments, a different one of the controllers (e.g. ECM 14 or TVM 16) may be configured to perform the address comparison and assignment task.

Initialization of the address-assignment module, such as the HCM 12, can be performed by various means. For example, pre-configured HCM can be provided from the control system manufacturer, such as unique HCMs 12a-12d configured for their assigned propulsion device position and the number of propulsion devices in the corresponding system, i.e., each HCM 12-12d provided and maintained as a distinct part and having a unique SKU. Thus, a port outer HCM 12a would have a CAN address specifying its port outer position, as well as whether it is one of two, one of three, one of four, etc.

Alternatively, generic HCM 12 devices can be supplied, and the HCM can be configured as part of the configuration process for the control system 10. For example, the HCMs 12 may be able to automatically determine their location upon being connected to the electronic remote control (ERC) 30. Specifically, the ERC 30 may be equipped with a unique circuit board for each propulsion device 3a-3d that is configured with means for receiving the HCMs 12a-12d and indicating to each HCM its respective propulsion device position, and thus its CAN address. For example, each circuit board may supply a unique voltage amount to the connected HCM, wherein the voltage amount indicates the propulsion device position. The HCM 12a-12d connected to each circuit board 36a-36d is configured to automatically set its HCM CAN address to specify propulsion device position based on the jumper voltage. Each HCM 12a-12d is configured to associate the various jumper voltages with a propulsion device position, and thus a CAN address. To provide just one example, each HCM may be configured to set its own CAN address to one of a preset list of HCM CAN addresses based on the voltage at the analog pin 13a-13d. For example, each voltage level on a specified list of possible jumper voltages may be associated with a specific HCM CAN address, wherein the list includes a sufficient number of voltage levels and CAN addresses to specify all propulsion device arrangements (e.g. the number of propulsion devices and corresponding positions).

Figure 5:
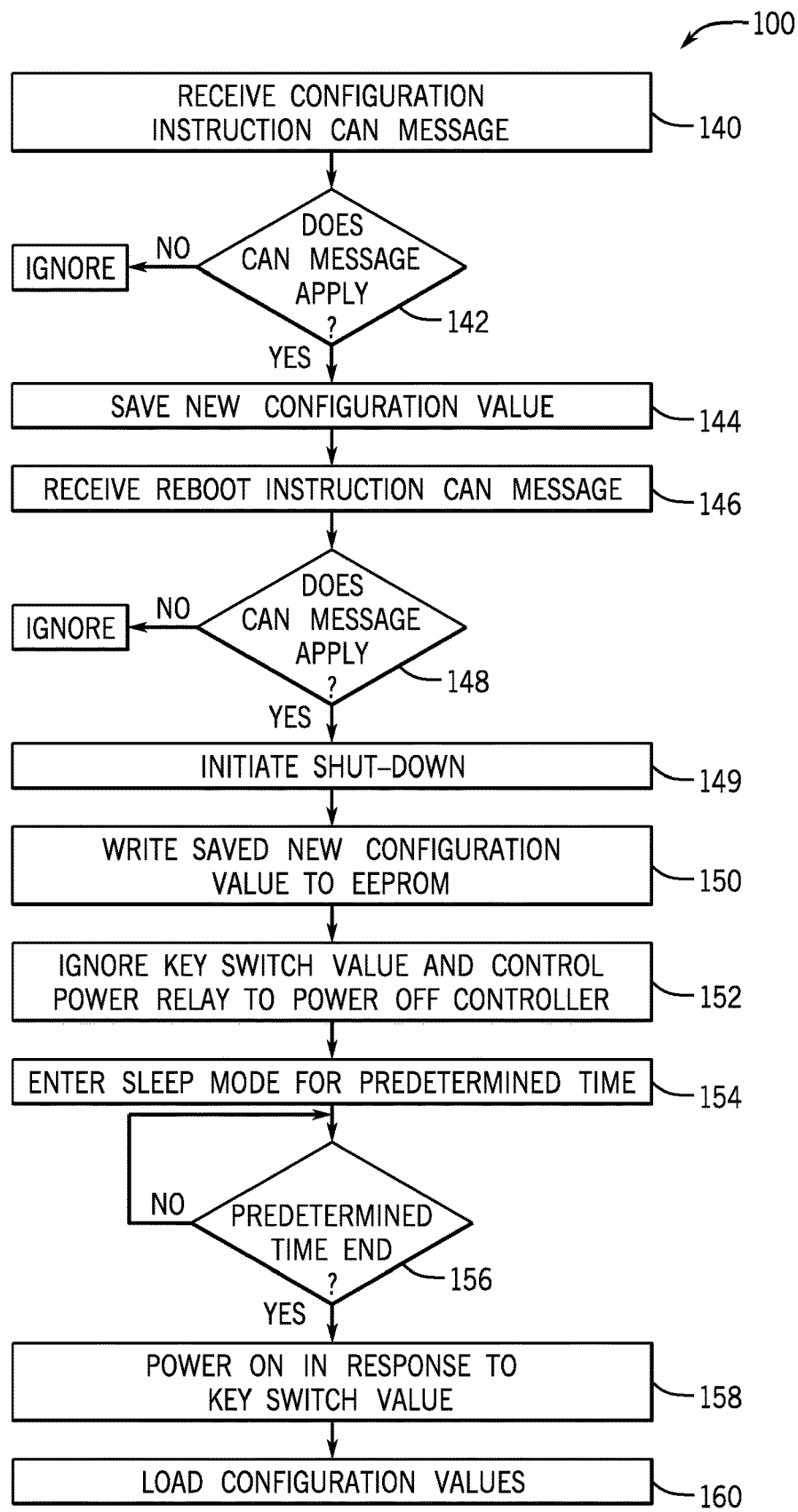
FIG. 5 is a flowchart depicting an exemplary method of configuring a marine propulsion system including automatic save and reboot functionality.

Alternatively or additionally, the steps represented at FIG. 5 may be executed as part of the method 100 of configuring a marine propulsion system 10. A configuration instruction CAN message is received at step 140 containing a new configuration value to be written to memory. For example, the new configuration value may be a new CAN address, such as a CAN address specifying the correct propulsion device position. In other embodiments, the configuration CAN instruction may contain additional or different configuration values, such as vessel personality values, user preferences, and/or any other configuration settings.

Step 142 is then executed to determine that the configuration instruction CAN message applies to the receiving controller—i.e., determining that the configuration instruction CAN message is directed to itself. For example, the receiving controller may determine that the configuration instruction CAN message is directed to itself if the CAN message is directed to a controller group to which the controller belongs. For example, the controller group may be directed to all HCMs 12a-12d, all ECMs 14a-14d, and/or all TVMs 16a-16d. The corresponding controllers configured to be a member of the designated controller group would determine that the message is directed to and applies to them. Alternatively, the determination that the message applies at step 142 may include determining that the configuration instruction CAN message is directed to a CAN address matching that of the receiving controller. In still other embodiments, the receiving controller may determine that the message applies based on the CAN bus on which the message is received. For example, a controller may be configured to respond to certain types of messages received via a certain CAN bus, such as its dedicated CAN bus. For example, all ECMs and TVMs may be configured to respond to certain instruction types received from the helm controller 12a-12d to which they are connected via the dedicated CAN bus 24a-24d. For example, each ECM 14a-14d and each TVM 16a-16d may be configured to respond to a change address configuration instruction CAN messages directed to an ECM controller group or directed to a TVM controller group and received via the dedicated CAN bus 24a-24d.

Upon determining that the CAN message applies, the respective controller saves the new configuration value at step 144. For example, a new configuration value may be stored in random access memory 53 to await shutdown procedures where reflashing occurs and the new configuration values are written to EEPROM 54 (or other memory that maintains the data when the controller 12, 14, 16 is powered off). Once a reboot instruction CAN message is received at step 146, the receiving controller then determines that the message applies at step 148. Each controller's determination that the reboot instruction CAN message is directed to itself can take any of the forms discussed above with respect to step 142. If a CAN message does not apply, the message is simply ignored and no action is taken by the receiving controller.

If at step 148 the receiving controller determines that the reboot instruction CAN message is directed to itself, then it initiates shutdown at step 149 and writes the saved new configuration value to EEPROM 54 at step 150 (or to FRAM or to another memory type). Once the reflash is complete, step 152 is executed to power off the controller 12, 14, 16. Specifically, since the corresponding key switch 66 is on, the key switch value provided to the respective controller 12, 14, 16 (e.g., key switch input 64) is indicating that the respective controller should remain on. Accordingly, the key switch value is ignored. Additionally, the main power relay 60 for the controller 12, 14, 16 must be controlled to cut off power from the voltage source to the processing system 50 and storage system 52 so that the respective controller 12, 14, 16 shuts down completely.

In certain embodiments, instructions may be executed to maintain the controller in sleep mode at step 154 so that the controller does not restart immediately. For example, the controller may be maintained in sleep mode for a predetermined amount of time, such as to guarantee complete shutdown of the respective controller 12, 14, 16 and/or to keep the respective controller offline while other controllers 12, 14, 16 in the control system 10 complete their reboot process. Once the predetermined amount of time passes at step 156, the controller 12, 14, 16 can stop ignoring the key switch value and can respond normally to the key switch value in order to power on at step 158. The boot procedures are executed to load the configuration values at step 160, which will include the new configuration values just written to EEPROM.

Each of the controllers 12, 14, 16 in the control system 10 may be configured with computer-executable instructions to perform some version of the steps depicted at FIG. 5 to allow automatic reboot in order to write new configuration values to memory. Each controller 12, 14, 16 may execute different verification procedures to determine that a message is directed to itself prior to executing the instructions. For example, certain controllers may be configured to only respond to reboot instruction CAN messages from certain senders and/or delivered via certain CAN buses 20, 22, 24. For example, the HCMs 12a-12d may be configured to respond to reboot instruction CAN messages sent by the configuration computer 40. In certain examples, ECMs 14a-14d and TVMs 16a-16d may be configured to respond to reboot instruction CAN messages sent from the configuration computer 40 over the propulsion CAN bus 20, such as reboot instruction CAN messages sent from the configuration computer 40 and directed to a controller group to which the controller 14, 16 belongs. Alternatively or additionally, the ECMs 14a-14d and TVMs 16a-16d may be configured to respond to reboot instruction CAN messages sent by the corresponding HCM 12a-12d sent via the dedicated CAN bus 24a-24d. For example, each HCM 12a-12d may be configured to send a reboot instruction CAN message via the corresponding dedicated CAN bus 24a-24d directed to all ECMs 14a-14d and all TVMs 16a-16d. Such a message will only be received by the ECM and TVM corresponding to the same propulsion device 3a-3d.

In addition to the automated reboot, various controllers 12, 14, 16 may be configured to respond to a silence CAN message in order to decrease traffic on one or more of the CAN buses 20, 22, 24 during the reboot processes so as to not disrupt any reflashing that is occurring and to open up bandwidth on the CAN buses 20, 22, 24 in order to expedite the reflashing. The controllers 12, 14, 16 and other devices communicating within the control system 10, including the one or more helm devices (e.g., joystick 38, steering wheel 39, and/or display 44) may be configured to respond to the silence CAN message by either stopping transmission of any CAN message on the first CAN bus or ceasing CAN-related diagnostics, or both. For control modules 12, 14, 16, ceasing both transmissions of CAN messages and CAN-related diagnostics may be utilized, which will avoid the problem of unnecessary error generation by the respective controller 12, 14, 16. In certain embodiments, the control system 10 may be configured to provide differentiated silence CAN message types, such as a silence CAN message containing a stop CAN transmission instruction and a different silence CAN message containing a stop diagnostics instruction. The various controllers 12, 14, 16, helm devices 38, 39, 44 and other devices communicating on the CAN system can be configured to respond to each type of silence CAN message accordingly.

Figure 6:
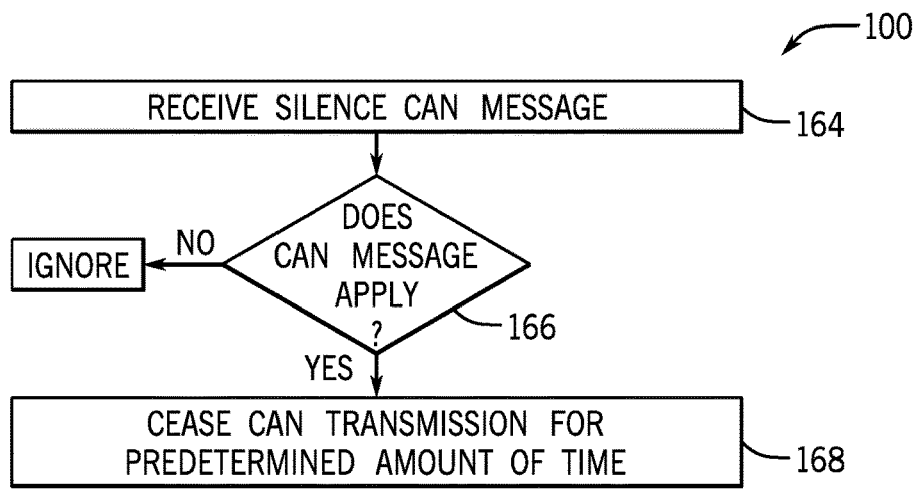
FIGS. 6 and 7 depict exemplary methods, or portions thereof, of configuring a marine propulsion system including silencing CAN transmission during reboot and reflashing.
Figure 7:
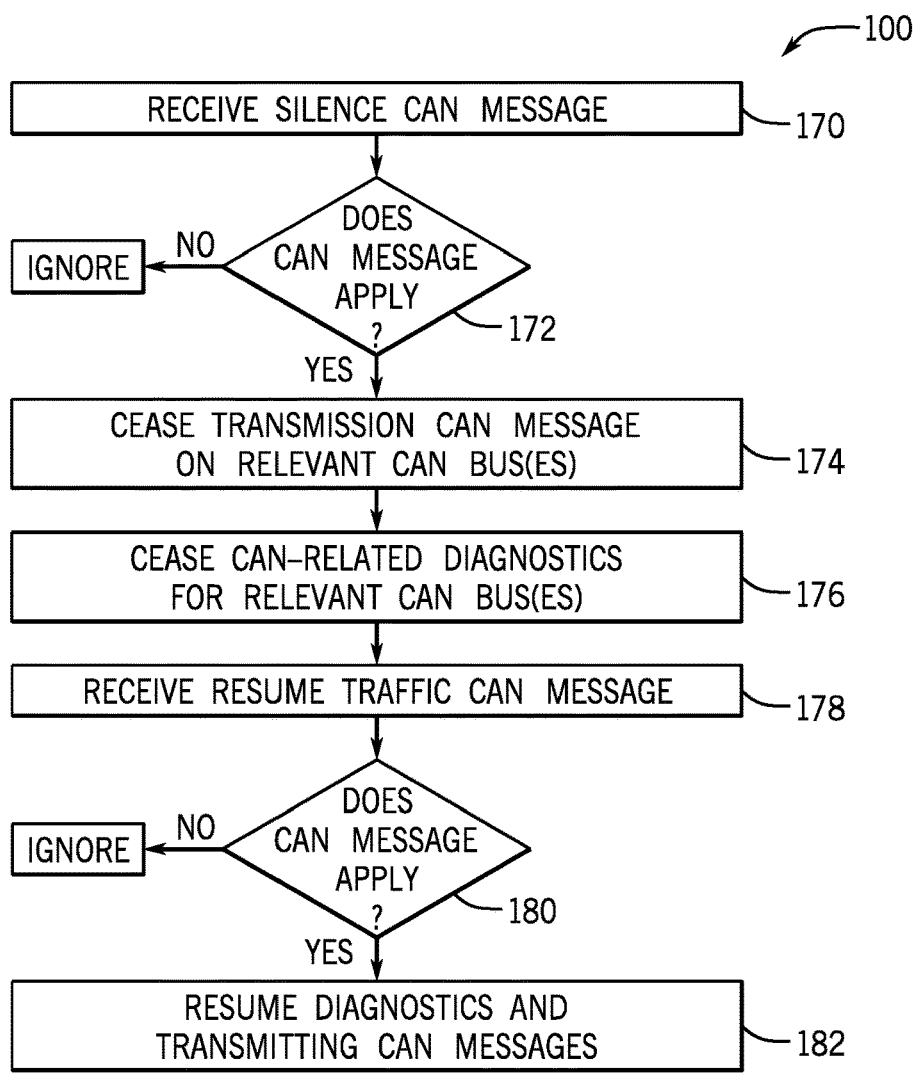
Figure 8:
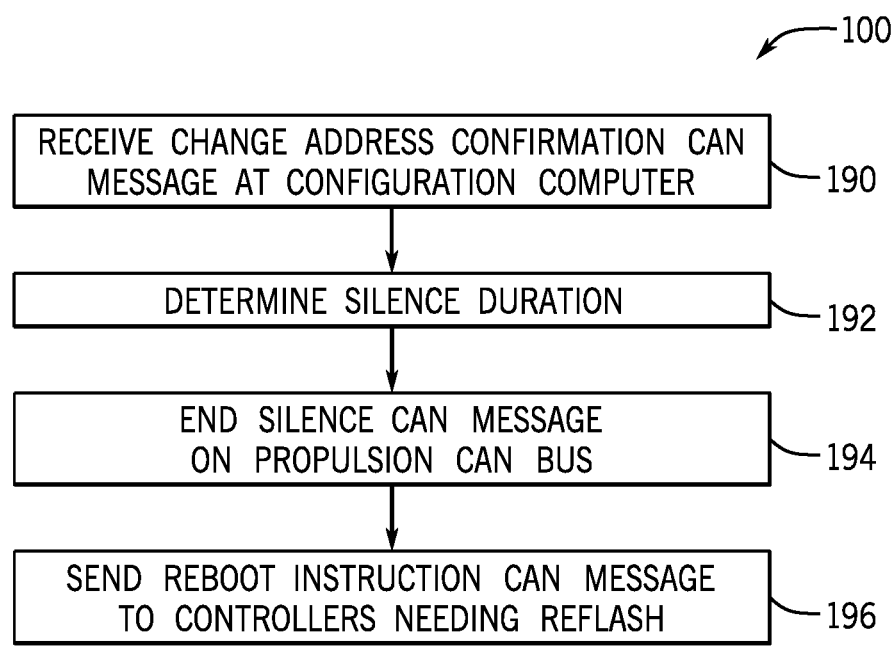
FIG. 8 is a flowchart depicting an exemplary method executed by a configuration computer to silence CAN transmission and initiate reboot.

Exemplary steps for executing a method 100 of configuring a marine propulsion system involving silence CAN messaging are exemplified at FIGS. 6-8. In the embodiment of FIG. 6, a silence CAN message is received at step 164. In various embodiments, the silence CAN message may be transmitted by the configuration computer 40 and directed to one or all of the controllers 12, 14, 16, and/or all devices receiving CAN messages via the CAN bus (e.g., 20, 22, 24) on which the silence CAN message is sent. In other embodiments, the silence CAN message may be transmitted by a controller 12, 14, 16 configured to send such messages, such as to the other controllers 12, 14, 16 associated with the same propulsion device 3. Upon receipt of a silence CAN message, each controller 12, 14, 16 and other device receiving the message is configured to determine whether the message applies at step 166. Exemplary methods for determining whether a message applies are described above with respect to FIG. 5. If the message does apply, then the controller ceases transmission of CAN messages for a predetermined amount of time at step 168. Upon expiration of the predetermined amount of time, the controller will resume CAN transmission. In certain embodiments, the controller 12, 14, 16 may be configured to turn off its CAN transceiver 58 for the predetermined amount of time.

In other embodiments such as that depicted in FIG. 7, the controller 12, 14, 16 may be configured to cease CAN transmission and/or cease CAN-related diagnostics until a resume traffic CAN message is subsequently received to cancel, or override, the silence CAN message instruction. In the embodiment at FIG. 7, a silence CAN message is received at step 170 and a determination of whether the CAN message applies (i.e., that the silence CAN message is directed to the receiving controller) is made at step 172. If the silence CAN message applies, then the controller ceases transmitting CAN messages on the relevant CAN buses at step 174. For example, the controller 12, 14, 16 may be configured to stop all CAN transmission on all CAN buses 20, 22, 24 to which it is connected. In other embodiments, the controller 12, 14, 16 may be configured to only stop transmitting CAN messages on one or more particular CAN buses, such as the CAN bus on which the silence CAN message was received. For example, the processing system 50 may cease instructing the CAN transceiver 58 to communicate any messages on the CAN bus to which the silence instruction applies. In other embodiments, the processing system 50 may instruct the CAN transceiver 58 not to transmit any CAN messages on the relevant CAN bus(es) to which the silence instruction applies.

CAN related diagnostics are also suspended at step 176 for the relevant CAN bus(es), such as any diagnostics relating to messages expected to be received, transmitted, or confirmed via the relevant CAN bus(es). The suspension of the CAN message transmission and CAN-related diagnostics are suspended until receipt of a resume traffic CAN message at step 178, which cancels the silence instruction. The controller examines the resume traffic CAN message at step 180 to verify that the CAN message is directed to itself and, if so, resumes diagnostics and transmission of CAN messages.

FIG. 8 depicts one embodiment of a method 100 of configuring a marine propulsion control system wherein a configuration computer 40 executes configuration control software 41 in order to send a silence CAN message and reboot instruction CAN message in order to cause one or more controllers to reflash and save a new CAN address. At step 190, a change address confirmation is received at the configuration computer 40, such as from one or more HCMs 12a-12d following their transmission of one or more identification CAN messages to change the CAN address of one or more other controllers. Step 192 is executed by the configuration computer to determine a silence duration, which is a duration for which the responding control modules 12, 14, 16 and/or other devices will cease transmission of CAN messages and/or CAN-related diagnostics. For example, the configuration computer may determine the silence duration based on the amount of data being written to any one controller during reflash and the expected amount of time it will take to compete that reflash. Alternatively or additionally, the silence duration may be determined to include a sleep mode period, where the respective controllers will remain powered off and unresponsive to the key switch value. The silence CAN message is then sent at step 194, wherein the silence CAN message specifies the silence duration, which can then be received and followed by the various devices communicating on the CAN bus where the silence CAN message is transmitted. For example, the configuration computer 40 may transmit the silence CAN message on the propulsion CAN bus 20 so that it is received by all controllers 12, 14, 16 in the control system 10. The configuration computer 40 then sends a reboot instruction CAN message, such as directed to the controllers 12, 14, 16 needing reflash. For example, the reboot instruction may be directed to the controllers for which the change address confirmation CAN message was received. For example, if the change address confirmation CAN message was received from the port outer HCM 12a indicating that the corresponding ECM 14a and TVM 16a have been instructed to change their respective CAN addresses, then the reboot instruction CAN message may be directed to the HCM 12a, which may then be relayed to the ECM 14a and TVM 16a via the dedicated CAN bus 24a. Alternatively, the configuration computer 40 may instruct all ECMs 14a-14d and all TVMs 16a-16d to reboot. Accordingly, all controllers 12, 14, 16 are silenced, which opens up bandwidth to expedite the reflash procedures and, in certain examples, also suspends the CAN-related diagnostics within each control device 12, 14, 16 so that needless error messages are not generated and stored by each controller 12, 14, 16.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine propulsion control system comprising:
   a first controller area network (CAN) bus communicatively connecting two or more devices to facilitate communication of CAN messages therebetween;
   a helm controller (HCM) associated with at least one propulsion device and having an HCM CAN transceiver to facilitate receipt and transmission of CAN messages by the HCM on the first CAN bus;
   wherein the HCM is configured to:
      receive a silence CAN message via the first CAN bus;
      determine that the silence CAN message is directed to itself; and
      in response to the silence CAN message, cease transmitting any CAN message on the first CAN bus and/or cease CAN-related diagnostics so as to reduce traffic on the first CAN bus.

2. The system of claim 1, further comprising a configuration computer operating configuration control software, wherein the configuration computer communicates on the first CAN bus and is configured to send the silence CAN message to the HCM via the first CAN bus;
   wherein the silence CAN message is sent out prior to reflashing a device communicating on the first CAN bus so as to reduce traffic thereon so as to expedite the reflashing.

3. The system of claim 2, wherein the silence CAN message is sent out by the configuration computer to all devices communicating on the first CAN bus prior to reflashing a controller communicating on the first CAN bus.

4. The system of claim 2, wherein the HCM is further configured to stop transmitting any CAN messages on the first CAN bus and to stop the CAN-related diagnostics on the first CAN bus in response to the silence CAN message until a resume traffic CAN message is received.

5. The system of claim 2, wherein the HCM is further configured to stop transmitting any CAN messages on the first CAN bus and to stop the CAN-related diagnostics for a predetermined amount of time in response to the silence CAN message.

6. The system of claim 5, further comprising an engine controller (ECM) communicatively connected to a propulsion device to effectuate control thereof, the ECM having an ECM CAN transceiver to facilitate receipt and transmission of CAN messages by the ECM on the first CAN bus; and
   wherein the HCM is configured to respond by turning off the HCM CAN transceiver for the predetermined amount of time and/or the ECM is configured to respond by turning off the ECM CAN transceiver for the predetermined amount of time.

7. The system of claim 2, wherein the silence CAN message specifies a silence duration; and
wherein the HCM is further configured to stop transmitting any CAN messages and to stop the CAN-related diagnostics on the first CAN bus for the silence duration specified in the silence CAN message.

8. The system of claim 7, wherein the configuration computer is configured to determine the silence duration based on an expected amount of time to complete the reflashing.

9. The system of claim 1, further comprising an engine controller (ECM) communicatively connected to a propulsion device to effectuate control thereof, the ECM having an ECM CAN transceiver to facilitate receipt and transmission of CAN messages by the ECM on the first CAN bus;
wherein the first CAN bus is a propulsion CAN bus communicatively connecting the HCM and the ECM to one or more other controllers associated other propulsion devices; and
a configuration computer operating configuration control software, wherein the configuration computer communicates on the propulsion CAN bus and is configured to send the silence CAN message to the HCM and the ECM via the propulsion CAN bus.

10. The system of claim 9, wherein the ECM's determination that the silence CAN message is directed to itself includes determining that the silence CAN message is directed to an ECM controller group; and
wherein the HCM's determination that the silence CAN message is directed to itself includes determining that the silence CAN message is directed to an HCM controller group.

11. The system of claim 1, further comprising:
an engine controller (ECM) communicatively connected to a propulsion device to effectuate control thereof, the ECM having an ECM CAN transceiver to facilitate receipt and transmission of CAN messages by the ECM on the first CAN bus;
a configuration computer operating configuration control software, wherein the configuration computer communicates on the first CAN bus;
at least one helm device having a device controller communicating on the first CAN bus;
wherein the configuration computer is configured to, prior to reflashing the device controller, send the silence CAN message to the HCM and the ECM via the first CAN bus; and
wherein the HCM and the ECM are configured to stop transmitting any CAN messages on the first CAN bus in response to the silence CAN message.

12. The system of claim 11, wherein the helm device is a display and the device controller is a display controller.

13. A method of configuring a marine propulsion control system, the method comprising:
providing at least a first controller area network (CAN) bus communicatively connecting two or more devices to facilitate communication of CAN messages therebetween;
providing a first controller associated with at least one propulsion device and having a CAN transceiver to facilitate receipt and transmission of CAN messages by the first controller on the first CAN bus;
at the first controller:
receiving a silence CAN message via the first CAN bus;
determining that the silence CAN message is directed to itself; and
ceasing transmission of any CAN message on the first CAN bus in response to the silence CAN message so as to reduce traffic on the first CAN bus and ceasing CAN-related diagnostics in response to the silence CAN message so as to reduce error generation.

14. The method of claim 13, further comprising providing a configuration computer operating configuration control software, wherein the configuration computer is configured to communicate on the first CAN bus and is configured to send the silence CAN message to the first controller via the first CAN bus;
wherein the configuration computer sends the silence CAN message prior to reflashing a device communicating on the first CAN bus so as to reduce traffic thereon so as to expedite the reflashing.

15. A method of claim 13, wherein the first controller is a helm controller (HCM) and further comprising:
providing an engine controller (ECM) communicatively connected to the propulsion device to effectuate control thereof;
providing a thrust vector controller (TVM) configured to control a steering actuator connected to the propulsion device;
providing a dedicated CAN bus communicatively connecting the HCM, the ECM, and the TVM so as to communicate CAN messages therebetween;
at the HCM, sending the silence CAN message to the ECM and the TVM;
at each of the ECM and the TVM:
determining that the silence CAN message is received via the dedicated CAN bus; and
ceasing transmission of any CAN message on the first CAN bus in response to the silence CAN message so as to reduce traffic on the first CAN bus to expedite reflashing of a device communicating on the first CAN bus and ceasing CAN-related diagnostics in response to the silence CAN message so as to reduce error generation.

16. The method of claim 14, wherein the silence CAN message is sent out by the configuration computer via the first CAN bus to all devices communicating on the first CAN bus prior to reflashing a second controller communicating on the first CAN bus.

17. The method of claim 13, further comprising ceasing transmission of any CAN messages on the first CAN bus and ceasing the CAN-related diagnostics by the first controller in response to the silence CAN message until a resume traffic CAN message is received at the first controller via the first CAN bus.

18. The method of claim 13 further comprising ceasing transmission of any CAN messages on the first CAN bus and ceasing the CAN-related diagnostics by the first controller for a predetermined amount of time in response to the silence CAN message.

19. The method of claim 13, further comprising:
providing a configuration computer operating configuration control software, wherein the configuration computer is configured to communicate on the first CAN bus;
at the configuration computer, determining a silence duration based on an expected amount of time to complete a reflashing;
wherein the configuration computer is configured to send the silence CAN message to the first controller via the first CAN bus such that the silence CAN message specifies the silence duration; and wherein the first controller is further configured to stop transmitting any CAN messages and to stop the CAN-related diagnostics on the first CAN bus for the silence duration specified in the silence CAN message.

20. The method of claim 13, wherein the at least the first controller includes at least a helm controller (HCM) and an engine controller (ECM) associated with the propulsion device, and wherein the first CAN bus is a propulsion CAN bus communicatively connecting the HCM and the ECM to one or more other controllers associated other propulsion devices; and wherein the HCM and the ECM cease any CAN message on the propulsion CAN bus in response to the silence CAN message so as to reduce traffic on the propulsion CAN bus so as to expedite a reflashing.

* * * * *